United States Patent
Le

(10) Patent No.: US 7,535,718 B2
(45) Date of Patent: May 19, 2009

(54) MEMORY CARD COMPATIBLE WITH MULTIPLE CONNECTOR STANDARDS

(75) Inventor: Trung V. Le, White Bear Township, MN (US)

(73) Assignee: Imation Corp., Oakdale, MN (US)

(*) Notice: Subject to any disclaimer, the term of this patent is extended or adjusted under 35 U.S.C. 154(b) by 300 days.

(21) Appl. No.: 10/644,484

(22) Filed: Aug. 20, 2003

(65) Prior Publication Data

US 2005/0037647 A1    Feb. 17, 2005

(51) Int. Cl.
    *H05K 1/14* (2006.01)
(52) U.S. Cl. .................. 361/737; 439/131; 361/736
(58) Field of Classification Search .......... 361/735, 361/785, 788, 790, 803, 733, 736–737; 365/51–52, 365/63, 72, 130; 710/301, 303; 257/679, 257/693, 730, 789; 439/131, 377
    See application file for complete search history.

(56) References Cited

U.S. PATENT DOCUMENTS

| | | | |
|---|---|---|---|
| 4,647,123 A * | 3/1987 | Chin et al. ................. 439/61 |
| 4,885,482 A * | 12/1989 | Sharp et al. .................. 326/47 |
| 5,537,584 A | 7/1996 | Miyai et al. |
| 6,111,757 A * | 8/2000 | Dell et al. .................. 361/737 |
| 6,116,927 A | 9/2000 | Johnson et al. |
| 6,148,354 A | 11/2000 | Ban et al. |
| 6,175,517 B1 * | 1/2001 | Jigour et al. .................. 365/63 |
| 6,292,863 B1 | 9/2001 | Terasaki et al. |
| 6,295,031 B1 | 9/2001 | Wallace et al. |
| 6,385,677 B1 * | 5/2002 | Yao .......................... 711/115 |
| 6,567,273 B1 | 5/2003 | Liu et al. |
| 6,618,256 B1 * | 9/2003 | Bovio et al. ................. 361/727 |
| 6,676,420 B1 | 1/2004 | Liu et al. |
| 6,695,637 B1 * | 2/2004 | Liu .......................... 439/377 |
| 6,795,327 B2 | 9/2004 | Deng et al. |
| 6,829,672 B1 | 12/2004 | Deng et al. |
| 6,890,188 B1 * | 5/2005 | Le ............................ 439/76.1 |
| 6,908,038 B1 * | 6/2005 | Le ............................ 235/492 |
| 7,092,256 B1 * | 8/2006 | Salazar et al. ............... 361/737 |
| 2002/0147882 A1 | 10/2002 | Pua et al. |
| 2002/0166009 A1 | 11/2002 | Lin |
| 2002/0178307 A1 | 11/2002 | Pua et al. |
| 2003/0095386 A1 | 5/2003 | Le et al. |
| 2003/0121848 A1 * | 7/2003 | Use et al. .................... 210/521 |
| 2003/0221066 A1 * | 11/2003 | Kaneko ....................... 711/115 |
| 2004/0033727 A1 * | 2/2004 | Kao ........................... 439/660 |
| 2004/0039854 A1 * | 2/2004 | Estakhri et al. ............... 710/11 |

(Continued)

FOREIGN PATENT DOCUMENTS

CN    1304115    7/2001

(Continued)

*Primary Examiner*—Dean A. Reichard
*Assistant Examiner*—Abiy Getachew
(74) *Attorney, Agent, or Firm*—Eric D. Levinson

(57) ABSTRACT

The invention is directed to a memory card that includes two or more connectors that conform to different connector standards. In one embodiment, the first connector conforms to a device communication connector (DCC) standard to facilitate direct coupling of the memory card to a portable device such as a voice recorder, a digital video camcorder, a digital camera, a personal digital assistant (PDA), a cellular phone, a video game, a digital television, a photo printer, or the like. The second connector may comprise a host computer connector (HCC) for direct coupling to a computing device without an adapter or reader.

15 Claims, 8 Drawing Sheets

U.S. PATENT DOCUMENTS

2004/0089717 A1 * 5/2004 Harari et al. .................. 235/441
2005/0044437 A1 * 2/2005 Dunstan et al. ............. 713/322

FOREIGN PATENT DOCUMENTS

| | | | |
|---|---|---|---|
| EP | 1 333 531 A1 | 8/2003 | |
| JP | 2002-084930 | * | 3/2002 |
| WO | WO 01/61692 A1 | 2/2000 | |

* cited by examiner

MEMORY CARD COMPATIBLE WITH MULTIPLE CONNECTOR STANDARDS

TECHNICAL FIELD

The invention relates to removable storage media devices and, in particular, removable memory cards.

BACKGROUND

A wide variety of removable storage media exists for use with voice recorders, digital video camcorders, digital cameras, personal digital assistants (PDAs), cellular phones, video games, digital televisions, photo printers, and the like. The removable storage media allows users to capture and store data on such devices, and easily transport the data between these various devices and a computer.

One of the most popular types of removable storage media is the flash memory card, which is compact, easy to use, and has no moving parts. A flash memory card includes an internal, high-speed solid-state memory capable of persistently storing data without application of power. Numerous other memory standards can also be used in memory cards, including electrically-erasable-programmable-read-only-memory (EEPROM), non-volatile random-access-memory (NVRAM), and other non-volatile or volatile memory types, such as synchronous dynamic random-access-memory (SDRAM), with battery backup.

A wide variety of memory cards have been recently introduced, each having different capacities, access speeds, formats, interfaces, and connectors. Examples of memory cards include CompactFlash™ (CF) first introduced by SanDisk™ Corporation, the Memory Stick™ (MS) and subsequent versions including Memory Stick Pro and Memory Stick Duo developed by Sony Corporation, Smart Media™ memory cards, Secure Digital (SD) memory cards, and MultiMedia Cards (MMCs) jointly developed by SanDisk Corporation and Siemens AG/Infineon Technologies AG, and xD™ digital memory cards developed by Fuji.

Each of the different memory cards typically has a unique connector, which defines the electrical and mechanical interfaces of the card. Moreover, each different memory card generally requires a specialized adapter or reader for use with a computing device. The adapter or reader includes a specialized interface that conforms to that of the memory card, and an interface that can be accepted by a computer. For example, an adaptor or reader may include an interface to receive a memory card and an interface to connect to a host computer, such as a personal computer memory card international association (PCMCIA) interface including a 16 bit standard PC Card interface and a 32 bit standard CardBus interface, a Universal Serial Bus (USB) interface, a Universal Serial Bus 2 (USB2) interface, an IEEE 1394 FireWire interface, a Small Computer System Interface (SCSI) interface, an Advance Technology Attachment (ATA) interface, a serial ATA interface, a Peripheral Component Interconnect (PCI) interface, a conventional serial or parallel interface, or the like.

Conventional memory cards have only one connector to interface with a device. The same connector also interfaces with the adaptor or reader to allow the memory card to be read by a host computer. Most conventional adapters and readers support only a single type of memory card, causing a user to carry and interchange adapters or readers when using different types of memory cards.

SUMMARY

In general, the invention is directed to a memory card that includes two or more connectors that conform to different connector standards. In one embodiment, the first connector conforms to a device communication connector (DCC) standard to facilitate direct coupling of the memory card to a portable device such as a voice recorder, a digital video camcorder, a digital camera, a personal digital assistant (PDA), a cellular phone, a video game, a digital television, a photo printer, or the like. The second connector may comprise a host computer connector (HCC) for direct coupling to a computing device without an adapter or reader. In other embodiments, the first and second connectors may conform to different DCC standards or different HCC standards. In any case, the presence of two connectors that conform to different standards adds versatility to the memory card.

In one embodiment, the invention is directed to a memory card comprising a memory, a first connector electrically coupled to the memory and conforming to a first connector standard, and a second connector electrically coupled to the memory and conforming to a second connector standard.

In another embodiment, the invention is directed to a method comprising delivering power to a memory card comprising a memory, a first connector electrically coupled to the memory and conforming to a first connector standard, and a second connector electrically coupled to the memory and conforming to a second connector standard. The method further comprises detecting whether power is delivered to the memory card via the first connector or the second connector and enabling a controller to facilitate access to the memory based on whether power is delivered via the first connector or the second connector.

In another embodiment, the invention is directed to a system comprising a first device including a first electrical contact for receiving a connector that conforms to a first connector standard, a second device including a second electrical contact for receiving a connector that conforms to a second connector standard, and a memory card. The memory card includes a memory, a first connector conforming to the first connector standard such that the first connector can be received by the first electrical contact of the first device, and a second connector conforming to the second connector standard such that the second connector can be received by the second electrical contact of the second device. Each of the connectors and electrical contacts conform to DCC standards or HCC standards.

The invention is capable of providing many advantages. For example, if the first connector conforms to a DCC standard and the second connector conforms to an HCC standard, the memory card may directly couple to a computing device without the need for an adapter or reader. In other words, the first connector may facilitate electrical coupling to a portable device such as a voice recorder, a digital video camcorder, a digital camera, a personal digital assistant (PDA), a cellular phone, a video game, a digital television, a photo printer, or the like. Moreover, the second connector may facilitate direct coupling to a computing device, without the need for an adaptor or card reader.

Alternatively, if the first connector and the second connector conform to different DCC standards, the memory card would be compatible with a plurality of DCC standards. In that case, the memory card that conforms to the plurality of DCC standards can be interchangeably used with different portable devices that conform to the different standards. Similarly, if the first connector and second connector conform to different HCC standards, the memory card would conform to a plurality of HCC standards and thereby allow for interchangeable use with such standards.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
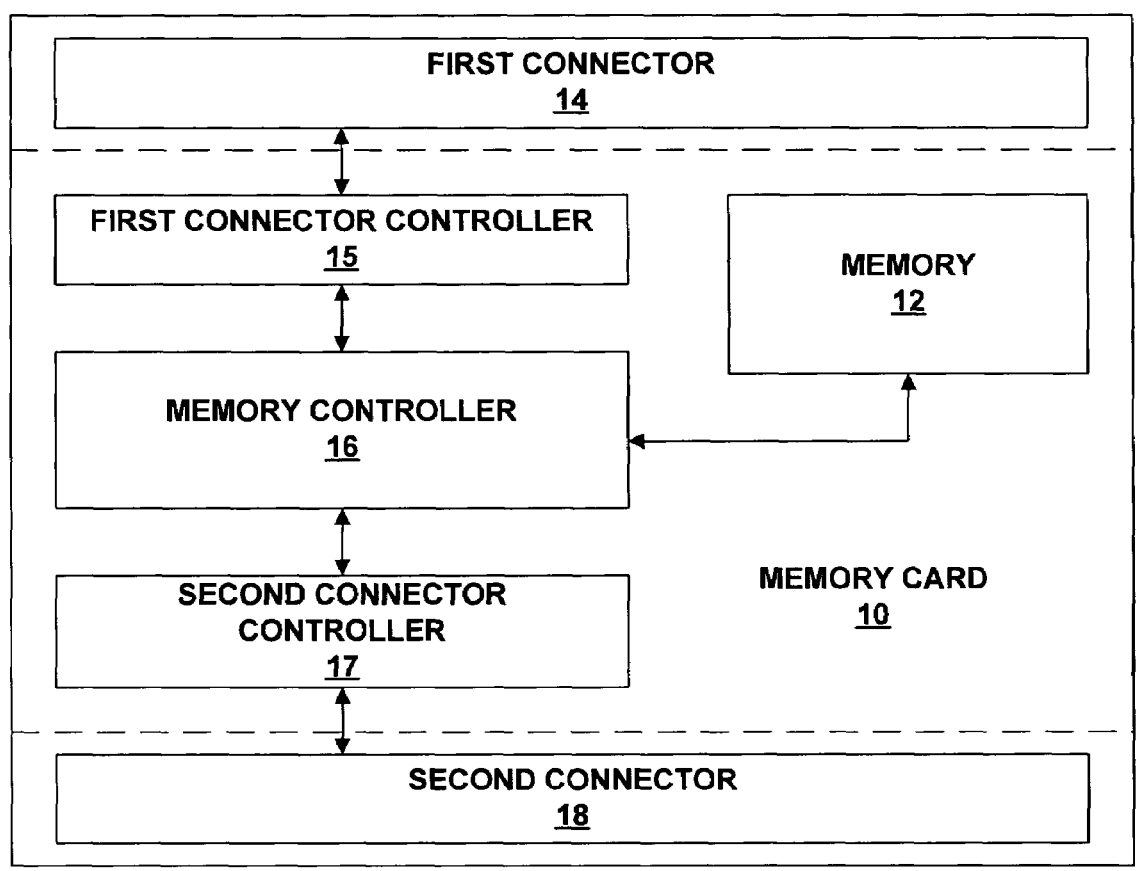
FIG. 1 is a block diagram illustrating an exemplary architecture of a removable memory card according to an embodiment of the invention.

FIG. 1 is a block diagram illustrating an exemplary architecture of a removable memory card 10. Memory card 10 includes a memory 12, a first connector 14, a first connector controller 15, a memory controller 16, a second connector controller 17, and a second connector 18. In accordance with an embodiment of the invention, each connector 14, 18 may be a device communication connector (DCC) or a host computer connector (HCC). For example, the DCC may be a Compact Flash standard, a Smart Media standard, a Multi-Media Card standard, a Secure Digital standard, a Memory Stick standard and subsequent versions including Memory Stick Pro and Memory Stick Duo, an xD standard, a yet released standard, or the like. The HCC may be a personal computer memory card international association (PCMCIA) interface including a 16 bit standard PC Card interface and a 32 bit standard CardBus interface, a Universal Serial Bus (USB) interface, a Universal Serial Bus 2 (USB2) interface, a future generation USB standard interface, an IEEE 1394 FireWire interface, a Small Computer System Interface (SCSI) interface, an Advance Technology Attachment (ATA) interface, a serial ATA interface, a Peripheral Component Interconnect (PCI) interface, a conventional serial or parallel interface, or the like.

First connector 14 may be electrically coupled to memory 12 via first connector controller 15 and memory controller 16. Second connector 18 may be electrically coupled to memory 12 via second connector controller 17 and memory controller 16. By way of example, memory 12 may comprise flash memory, electrically-erasable-programmable-read-only-memory (EEPROM), non-volatile random-access-memory (NVRAM), and other nonvolatile or volatile memory types, such as synchronous dynamic random-access-memory (SDRAM), or the like.

Power is applied to memory card 10 when it is connected via a DCC standard to a portable device or via an HCC standard to a computing device. The application of power allows the portable device or computing device to determine which electrical contact elements are active. Accordingly, the portable device or computing device can determine which connector 14, 18 is being used based on which electrical contact elements are active.

First connector controller 15 or second connector controller 17 is enabled to facilitate access to memory 12, depending on which connector 14, 18 is being used. Communication between the portable device or computing device and memory controller 16 may then be sent through the powered connector and the enabled controller. The portable device or computing device may read or modify data that is stored in memory 12 as well as store new data or erase existing data. Memory controller 16 manipulates the data stored in memory 16 according to operations specified by the portable device or computing device.

One embodiment of the invention includes first connector 14 conforming to a DCC standard and second connector 18 conforming to an HCC standard. In that case, the need for an adapter or reader to couple memory card 10 to the computing device is eliminated. First connector 14 couples to a portable device contact conforming to the same DCC standard and operates in a similar manner to a conventional memory card. Second connector 18 couples directly to a computing device port conforming to the same HCC standard and enables communication between the computing device and memory controller 12. In this way, an adapter's function may be included in any memory card format, eliminating the need for an adapter or reader.

Another embodiment of the invention includes first connector 14 and second connector 18 conforming to different DCC standards. In that case, each connector 14, 18 couples to a portable device contact conforming to the respective DCC standard associated with the connector 14 or 18. Accordingly, the invention may replace the need for two or more separate conventional memory cards by integrating two or more DCC standards into one memory card. Thus, in that case memory 12 may store information from different portable devices that conform to different DCC standards. For example, memory 12 may store pictures from a digital camera along with appointments from a PDA, even if the two portable device contacts do not conform to the same DCC standard. In this way, memory card 10 may eliminate the need for separate memory cards to couple to portable device contacts conforming to different DCC standards.

Another embodiment of the invention includes first connector 14 and second connector 18 conforming to different HCC standards. In that case, each connector 14, 18 directly couples to a computing device conforming to the HCC standard associated with the respective connector 14 or 18. Accordingly, in that case, memory card 10 may operate as a removable storage device that can couple to the computing device through more than one port. For example, if first connector 14 conforms to a USB standard and second connector 18 conforms to a FireWire standard, memory card 10 may couple to the computing device via a USB port or a FireWire port depending on which port the computing device is equipped with or which port is more accessible.

Another embodiment of the invention includes additional connectors that each conform to either a DCC standard or an HCC standard. Memory card 10 may couple to several portable device contacts conforming to different DCC standards and several computing device ports conforming to different HCC standards. In that case, memory card 10 may operate as a memory card, an external storage device, and an adapter or reader all integrated into one card.

Figure 2:
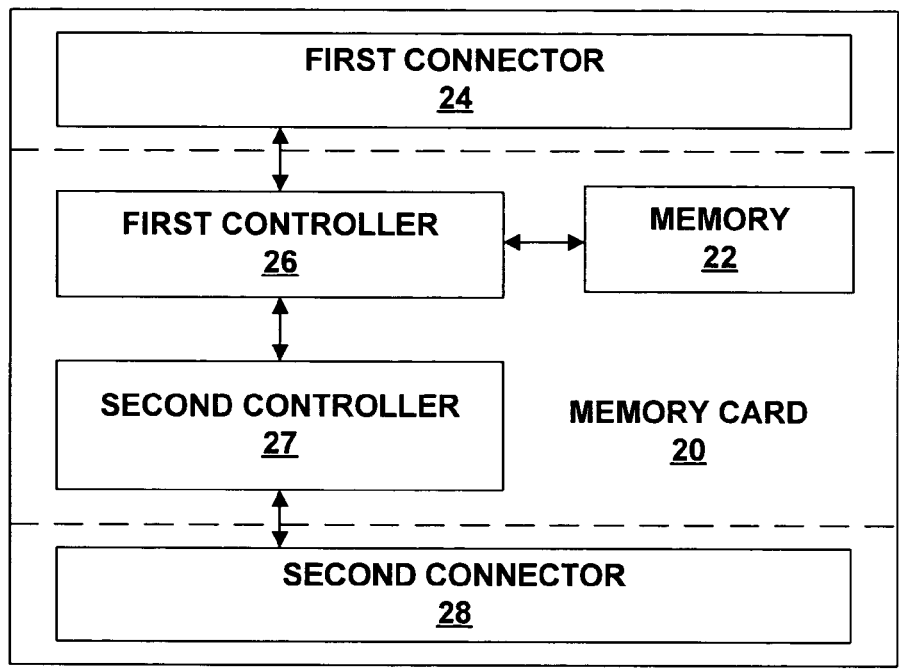
FIG. 2 is a block diagram illustrating an exemplary architecture of a removable memory card.

FIG. 2 is a block diagram illustrating another exemplary architecture of a removable memory card 20. Memory card 20 includes a memory 22, a first connector 24, a first controller 26, a second controller 27, and a second connector 28. By way of example, memory 22 may comprise flash memory, electrically-erasable-programmable-read-only-memory (EEPROM), non-volatile random-access-memory (NVRAM), and other nonvolatile or volatile memory types, such as synchronous dynamic random-access-memory (SDRAM), or the like.

Whereas, the architecture shown in FIG. 1 utilizes three separate controllers, i.e., one for each connector 14, 18 and one for the memory 12, the embodiment of FIG. 2, integrates the memory controller with the controller for first connector 24 as a common first controller 26. Such an integrated first controller 26 may consume less space and power than separate controllers. Moreover, controllers that integrate the memory and connector controls are commercially available for use in conventional memory cards that include a memory and a single connector.

First controller 26 controls memory 22 and output via first connector 24. The second controller 27 controls output via second connector 28. First connector 24 may be electrically coupled directly to first controller 26 and then to memory 22, while second connector 28 may be electrically coupled to memory 22 via second controller 27 and first controller 26.

In one embodiment of the invention, memory card 20 includes first connector 24 conforming to a DCC Compact Flash standard and second connector 28 conforming to an HCC USB standard. Memory card 20 also includes first controller 26 conforming to a flash memory controller, memory 22 conforming to a flash memory, and second controller 27 conforming to a USB controller. These components are readily available due to their wide usage in traditional removable memory cards and adapters or readers. Flash memory controllers are manufactured by SanDisk™ Corporation and Lexar Media Inc., among others. Flash memory is produced by many companies including Intel, Samsung, and Toshiba. USB controllers are typically found in flash memory card adaptors or readers and other devices utilizing USB connectivity. Such controllers are available from Cypress Semiconductor Corporation, Philips Semiconductors, and many other semiconductor companies. In this embodiment, substantially all the elements included in memory card 20 are already being produced for other purposes and may be purchased directly from the manufacturer.

Another embodiment of the invention includes first connector 24 and second connector 28 conforming to different DCC standards. In that case, connectors 24, 28 of memory card 20 allow memory card 20 to couple to portable device contacts conforming to different DCC standards. For example, memory card 20 may integrate the functionality of several conventional memory cards, each conforming to a single DCC standard, into one memory card.

In another embodiment, memory card 20 includes first connector 24 conforming to an HCC standard and second connector 28 conforming to a different HCC standard. In that case, memory card 20 functions as an external storage device that is able to couple to a computing device via several ports conforming to different DCC standards.

Another embodiment includes additional connectors (not shown) disposed on memory card 20. The connectors each conform to either a DCC standard or an HCC standard. Extra connectors allow memory card 20 to couple to several portable device contacts and several computing device ports. In any case, additional connectors, each conforming to a different standard, add versatility to memory card 20 and may eliminate the need for individual memory cards, external storage devices, and adaptors or readers.

Figure 3:
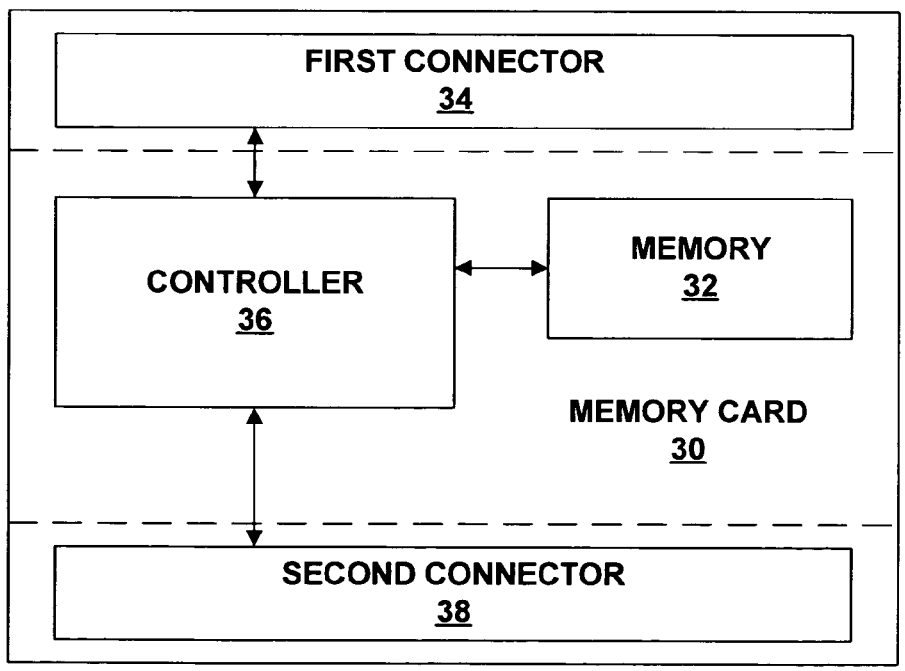
FIG. 3 is a block diagram illustrating an exemplary architecture of a removable memory card.

FIG. 3 is a block diagram illustrating another exemplary architecture of a removable memory card 30. In this embodiment, memory card 30 includes a memory 32, a first connector 34, a controller 36, and a second connector 38. Controller 36 comprises a memory controller integrated with a first connector controller and a second connector controller. Whereas the architecture shown in FIG. 1 utilizes a separate controller for each connector 14, 18 and the memory 12, controller 36 integrates such functionality of three different controllers into a common unit. By integrating the functionality of each separate controller into controller 36, less space and power may be consumed on memory card 30.

Controller 36 controls the memory 32 and output via first connector 34 and second connector 38. First connector 34 may be electrically coupled directly to controller 36 and then to memory 32. Second connector 38 may also be electrically coupled to memory 32 via controller 36.

In one embodiment, memory card 30 includes first connector 34 conforming to a DCC Compact Flash standard and second connector 38 conforming to an HCC USB standard. Memory card 30 also includes controller 36 conforming to a flash memory controller with USB control and memory 32 conforming to a flash memory. First connector 34 may couple to a portable device contact conforming to the Compact Flash standard. Second connector 38 may couple directly to a computing device's USB port allowing communication between the computing device and controller 36 without an adaptor or reader. The flash memory controller with USB control may be developed as an application specific integrated circuit (ASIC) integrating the functionality of a conventional flash memory controller and a USB controller.

Other embodiments of the invention include first connector 34 and second connector 38 conforming to different DCC standards or different HCC standards. Compatibility with multiple DCC standards allows memory card 30 to be used with multiple portable device contacts. In this way, memory card 30 integrates the functionality of several conventional memory cards together into a signal card. Similarly, compatibility with multiple HCC standards allows memory card 30 to act as an external storage device that is able to couple to one or more computing devices via different connector standards. Memory card 30 may also include additional connectors, each conforming to either a DCC standard or an HCC standard. Additional connectors may allow memory card 30 to couple to multiple portable device contacts and computing device ports. Memory card 30 can eliminate the need for adapters or readers to transfer data from memory 32 to the computing device.

FIGS. 4-12 are conceptual top views illustrating exemplary embodiments of removable memory cards according to an embodiment of the invention. The memory card in each figure may include a memory, a first connector, a first connector controller, a memory controller, a second connector controller, and a second connector. All three controllers may be separate, as seen in the embodiment of FIG. 1, or the memory controller may be integrated with either one or both connector controllers as seen in the embodiments of FIGS. 2 and 3. An integrated controller may be desirable if a limited amount of space or power is available on the memory card.

Figure 4:
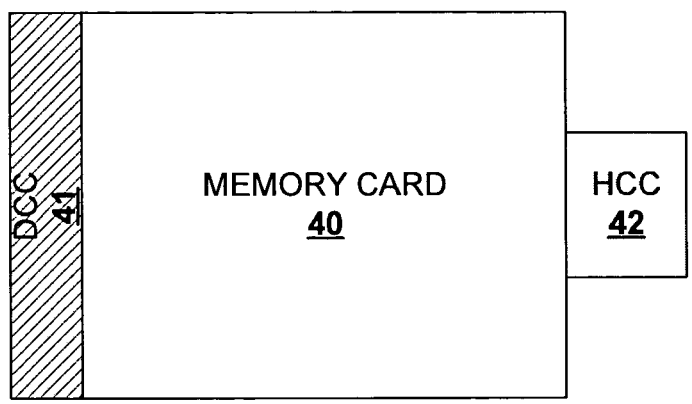
FIGS. 4-12 are conceptual top views illustrating exemplary embodiments of removable memory cards according to embodiments of the invention.

FIG. 4 is a conceptual top view illustrating an exemplary embodiment of a removable memory card 40, which may correspond to any of memory cards 10, 20 or 30. Memory card 40 includes a DCC 41 and an HCC 42 disposed on opposite sides of memory card 40. Memory card 40 may also include a memory, a memory controller, a DCC controller, and an HCC controller. A removable memory card with one DCC and one HCC may function as a conventional removable memory card without the need for an adapter to transmit the stored information to a computing device. DCC 41 couples memory card 40 to a portable device contact conforming to the same standard, allowing data to be stored in the memory. In order to view the stored data using the computing device, memory card 40 is removed from the portable device contact and turned around. HCC 42, located on the opposite side of memory card 40 from DCC 41, then couples to a port on the computing device that conforms to the same standard. The memory controller may then perform read and write operations on the memory as specified by the computing device.

Figure 5:
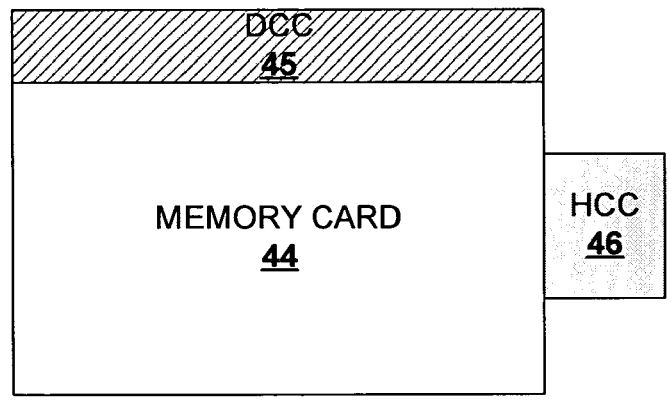

FIG. 5 is a conceptual top view illustrating another exemplary embodiment of a removable memory card 44, which may correspond to any of memory cards 10, 20 or 30. Memory card 44 includes a DCC 45 and an HCC 46 disposed on adjacent sides of memory card 44. Memory card 44 functions similarly to memory card 40 (FIG. 4). In order to view the data stored in the memory of memory card 44, memory card 44 is removed from the portable device contact and turned to the side on which HCC 46 is disposed. HCC 46 then couples to a computing device port conforming to the HCC standard supported by HCC 46. The stored data may be read and modified by the memory controller according to directions from the computing device.

Figure 6:
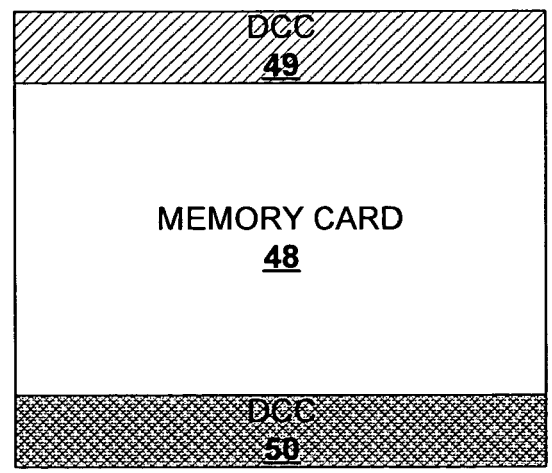

FIG. 6 is a conceptual top view illustrating an exemplary embodiment of a removable memory card 48, which may correspond to any of memory cards 10, 20 or 30. Memory card 48 includes a DCC 49 and a DCC 50 disposed on opposite sides of memory card 48. Alternatively, DCC 49 and DCC 50 may be disposed on adjacent sides of memory card 48. Memory card 48 may also include a memory, a memory controller, a first DCC controller, and a second DCC controller.

DCC 49 and DCC 50 may conform to different DCC standards. DCC 49 couples memory card 48 to a first portable device contact conforming to the first standard, so that data can be stored in the memory of card 48. In order to store data from a second portable device in the memory, memory card 40 is removed from the first portable device contact and turned to the side on which DCC 50 is disposed. DCC 50 then couples to the second portable device contact that conforms to the second standard. In this way, memory card 48 can eliminate the need for separate memory cards to couple to different portable device contacts.

Figure 7:
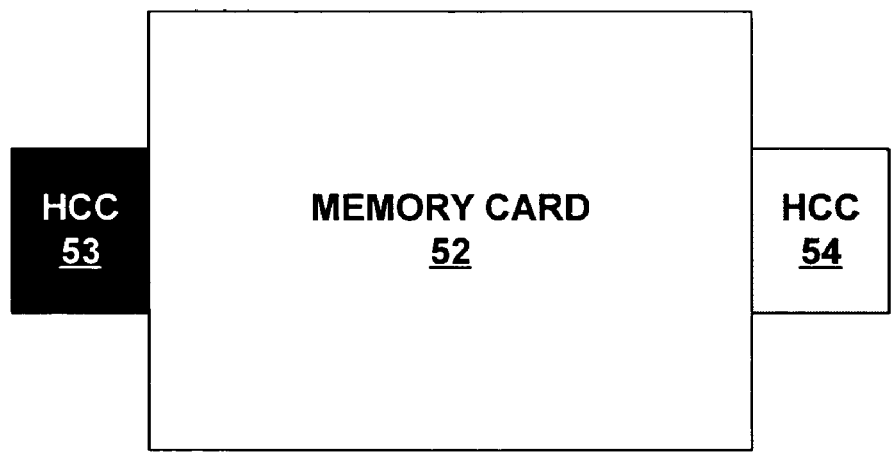

FIG. 7 is a conceptual top view illustrating an exemplary embodiment of a removable memory card 52, which may correspond to any of memory cards 10, 20 or 30. Memory card 52 includes an HCC 53 and an HCC 54 disposed on opposite sides of memory card 52. Alternatively, HCC 53 and HCC 54 may be disposed on adjacent sides of memory card 52. Memory card 52 may also include a memory, a memory controller, a first HCC controller, and a second HCC controller.

HCC 53 and HCC 54 may conform to different HCC standards. HCC 53 couples to a first computing device port conforming to the first standard, so the internal memory of the computing device can be expanded or supplemented. In particular, memory card 52 can supplement the memory and possibly increase memory access speed of a host device to which it is electrically coupled via one of HCC 53 and HCC 54. Moreover, memory card 52 can be removed from a first computing device port and turned to the side on which HCC 54 is disposed. HCC 54 can then be coupled to a second computing device port that conforms to the second standard. In that case, memory card 52 may be used as a removable storage device that is able to couple to different computing devices through different connector interfaces.

Figure 8:
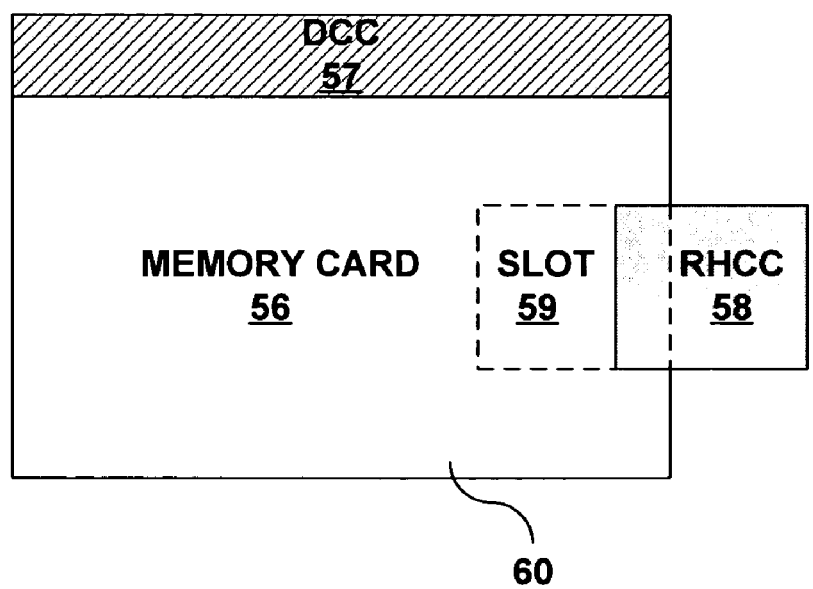

FIG. 8 is a conceptual top view illustrating an exemplary embodiment of a removable memory card 56, which may correspond to any of memory cards 10, 20 or 30. Memory card 56 includes a DCC 57, a retractable HCC (RHCC) 58, a slot 59 for RHCC 58 to retract into, and a housing 60. Memory card 56 may also include a memory, a memory controller, a DCC controller, and an RHCC controller. RHCC 58 functions similar to an HCC, as described herein, and conforms to an HCC standard. In addition, RHCC 58 has the ability to retract into slot 59 of housing 60 of memory card 56. Slot 59 may be designed to allow RHCC 58 to be flush with the edge of memory card 56 when retracted. RHCC 58 may be held in place by a type of locking mechanism (not shown) when retracted into slot 59. Similarly, another locking mechanism (not shown) may lock RHCC 58 in place when extended from housing 60 for use, or in both instances. The locking mechanism may be released by pushing a button (not shown) on memory card 56, depressing the end of RHCC 58, squeezing housing 60 of memory card 56, or the like. The locking mechanism may be spring loaded or may make use of other means by which RHCC 58 can be locked in place within slot 59.

As shown in FIG. 8, DCC 57 is disposed on a side of memory card 56 adjacent to the side associated with RHCC 58. DCC 57 and RHCC 58 may also be disposed on opposite sides of memory card 56. A removable memory card with one DCC and one RHCC may function as a conventional memory card without the need for an adapter or reader to transmit the information stored in the memory to a computing device. Memory card 56 may also assume a form factor similar to a conventional removable memory card when RHCC 58 is retracted into slot 59. Moreover, retracting RHCC 58 into slot 59 may protect the electrical contacts of the connector when it is not in use, ensuring that the connector remains in good condition. Thus, RHCC 58 may prolong the useful life of memory card 56 relative to other memory cards that include non-retractable HCC's.

Figure 9:
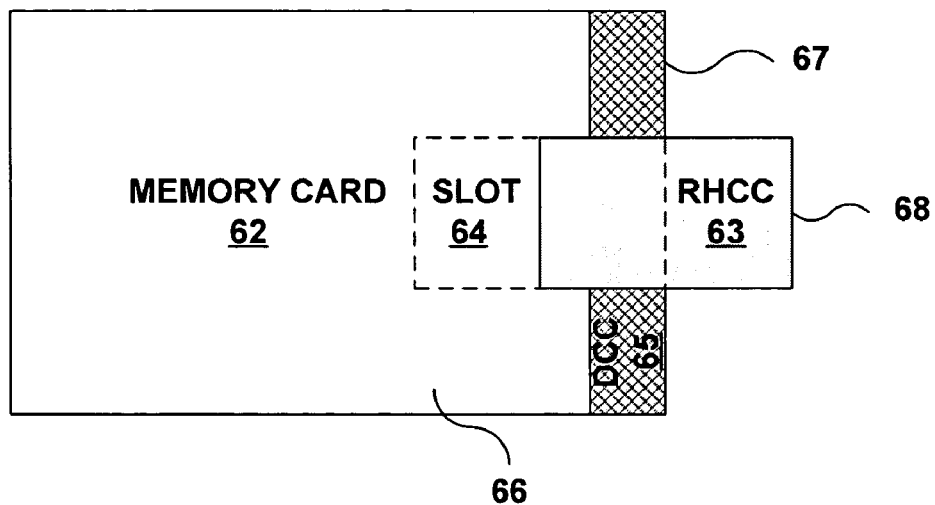

FIG. 9 is a conceptual top view illustrating an exemplary embodiment of a removable memory card 62, which may correspond to any of memory cards 10, 20 or 30. Memory card 62 includes a retractable HCC (RHCC) 63, a slot 64 for RHCC 63 to retract, a DCC 65, a housing 66, a stationary set of contact elements 67, and a movable subset of contact elements 68. Memory card 62 may include a memory, a memory controller, a DCC controller, and a RHCC controller.

RHCC 63 functions similar to an HCC and conforms to an HCC standard. RHCC 63 has the additional ability to retract into slot 64 in housing 66 of memory card 62. RHCC 63 differs from RHCC 58, described in reference to FIG. 8, because RHCC 63 is disposed on the same side of memory card 62 as DCC 65. In that case, RHCC 63 may share the movable subset of electrical contact elements 68 with DCC 65. When RHCC 63 is extended, it may couple to a port of a computing device conforming to the HCC standard of RHCC 63. The movable subset of contact elements 68 may then be active, and the HCC controller can be enabled to facilitate access to the memory from the computing device.

When RHCC 63 is retracted into slot 64, the movable subset of electrical contact elements 68 may be integrated into DCC 65. DCC 65 conforms to a DCC standard. The movable subset of contact elements 68 recombines with the stationary set of contact elements 67 to create a complete DCC 65. Contact elements 67, 68 may be plugged into an electrical contact of a portable device conforming to the corresponding DCC standard. The contact elements 67, 68 may then be detected as active, and the DCC controller within memory card 62 can be enabled to facilitate access to the memory from the portable device.

Slot 64 may be designed to ensure a proper alignment between the movable subset of contact elements 68 shared between RHCC 63 and DCC 65, and the remaining set of stationary contact elements 67 of DCC 65. RHCC 63 may lock into place when retracted into slot 64, when extracted for use, or in both instances. A locking mechanism (not shown) may hold RHCC 63 in slot 64 at the correct depth to allow the contact elements 67, 68 to operate as DCC 65 when RHCC 63 is retracted. The locking mechanism may be released by pushing a button (not shown), e.g., located on memory card 62, depressing the end of RHCC 63, squeezing housing 66 of memory card 62, or the like. For example, the locking mechanism may be spring loaded or may make use of other means to properly hold and align RHCC 63 within slot 64. In any case, utilizing the same contact elements for two or more connectors may reduce the number of elements in memory card 62 and allow memory card 62 to have several connectors on each side.

Figure 10:
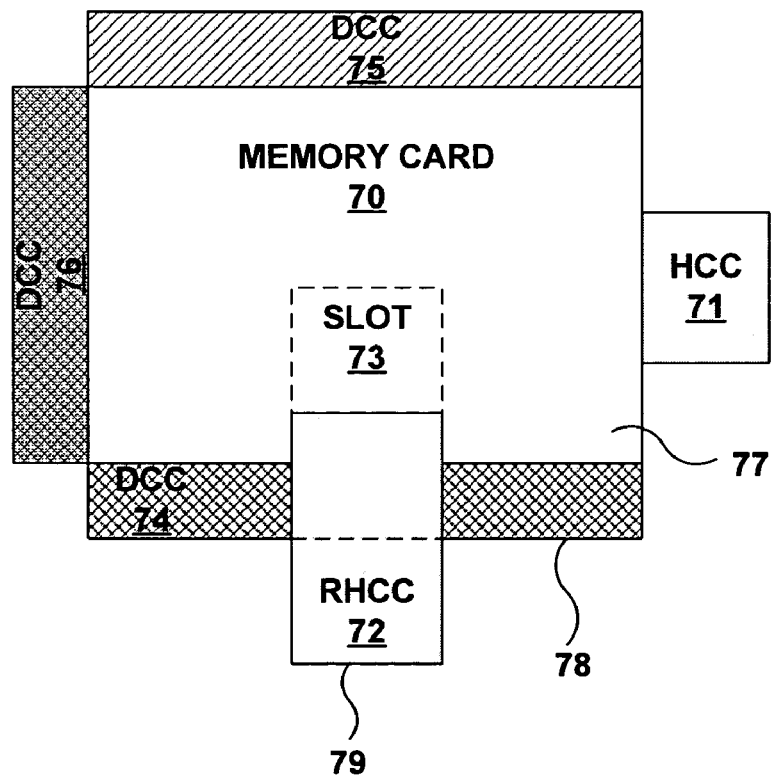

FIG. 10 is a conceptual top view illustrating another exemplary embodiment of a removable memory card 70. Memory card 70 includes an HCC 71, an RHCC 72, a slot 73, a DCC 74, a DCC 75, a DCC 76, a housing 77, a stationary set of contact elements 78, and a movable subset of contact elements 79. Memory card 70 may also include a memory, a memory controller, a first DCC controller, a second DCC controller, a third DCC controller, an HCC controller, and an RHCC controller. All of the connectors may be electrically coupled to the memory via corresponding connector controllers and a memory controller.

DCC 74, DCC 75 and DCC 76 may each conform to different DCC standards and couple memory card 70 to multiple portable devices with contacts that conform to the different DCC standards. HCC 71 and RHCC 72 may conform to different HCC standards, and couple memory card 70 to multiple computing devices with ports that conform to the different HCC standards. Memory card 70 may have a different number of connectors than shown in FIG. 10. The connectors may also conform to different standards and be disposed in different location on memory card 70.

When one of the connectors is coupled to a contact or port conforming to the respective standard of the connector, the contact elements of that connector are active. The active connector can be detected by the device to which memory card 70 is coupled, and the respective controller can be enabled to facilitate access to the memory from the portable device or computing device. Memory card 70 integrates the functionality of several conventional memory cards, several external storage devices, and several memory card adaptors or readers into one card.

Figure 11:
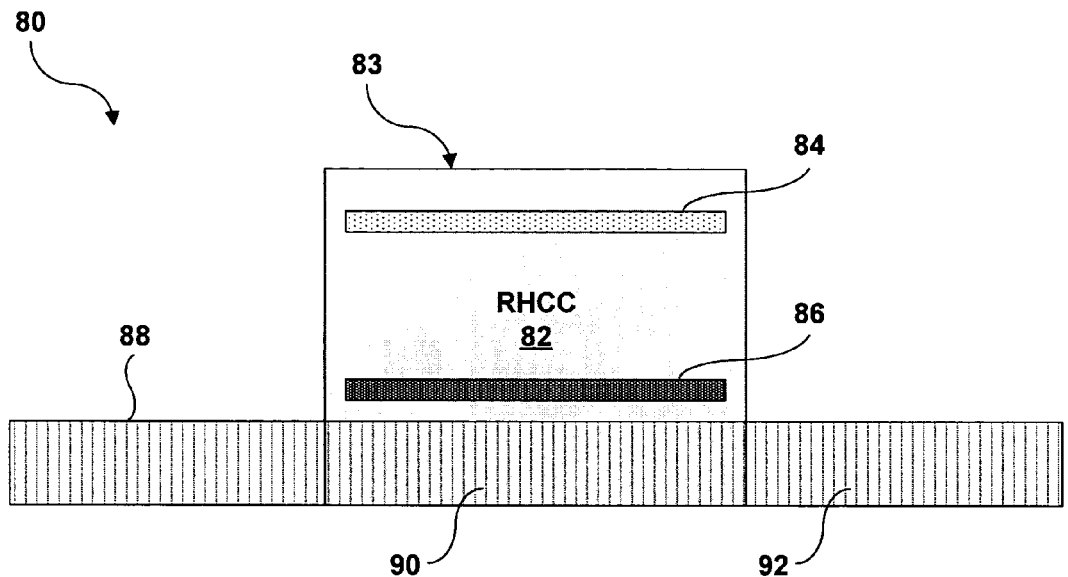

FIG. 11 is a conceptual top view illustrating another exemplary embodiment of a portion of removable memory card 80 with a retracted RHCC 82. Memory card 80 includes an RHCC 82, a slot 83, a first electrical contact 84, a second electrical contact 86, a DCC 88, a movable subset of contact elements 90, and a stationary set of contact elements 92. RHCC 82 and DCC 88 are disposed on the same side of memory card 80. RHCC 82 includes first electrical contact 84 disposed on RHCC 82. Slot 83 includes second electrical contact 86, which may couple with first electrical contact 84 disposed on RHCC 82. When RHCC 82 is retracted into slot 83, as shown in FIG. 11, first electrical contact 84 and second electrical contact 86 are uncoupled. In that case, the connector is used as DCC 88, and the entire set of contact elements 90, 92 may become active when coupled to a portable device contact.

RHCC 82 may be locked into slot 83 by a locking mechanism (not shown) when retracted. The locking mechanism may allow the movable subset of contact elements 90 to align properly with the stationary set of contact elements 92. When the contact elements 90, 92 are properly aligned, power applied to memory card 80 through DCC 88 may activate all contact elements 90, 92 and enable the DCC controller to allow access to the memory.

Figure 12:
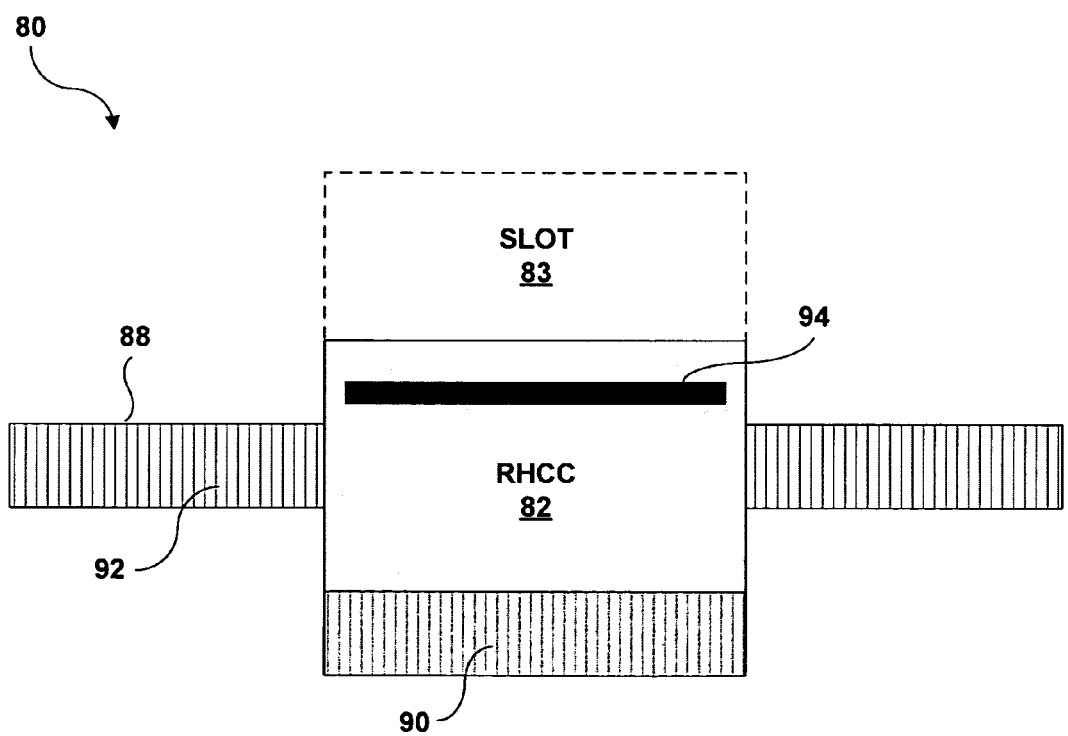

FIG. 12 is a conceptual top view illustrating an exemplary embodiment of a portion of removable memory card 80 with an extracted RHCC 82. When RHCC 82 is extended from slot 83, as shown in FIG. 12, the movable subset of contact elements 90 is extended from the stationary set of contact elements 92. First electrical contact 84 and second electrical contact 86 couple to one another as labeled at item 94, when RHCC 82 is extended from slot 83. When the two electrical contacts 84, 86 are coupled, the connector is used as RHCC 82 allowing only the movable subset of contact elements 90, and no stationary contact elements 92, to become active when coupled to a computing device port.

RHCC 82 may be locked into the edge of slot 83 by coupled electrical contact 94 or by an additional locking mechanism (not shown). When the electrical contacts 84, 86 are coupled together to lock RHCC 82 in the extended position, any power applied to memory card 80 through RHCC 82 may activate only the movable set of contact elements 90. The active subset of movable contact elements 90 may allow a memory controller to enable the RHCC controller to facilitate access to the memory on memory card 80.

FIG. 11 and FIG. 12 illustrate one possible configuration in which RHCC 82 is disposed on the same side of memory card 80 as DCC 88, sharing a subset of movable contact elements 90. A DCC controller of memory card 80 may only be enabled when first electrical contact 84 and second electrical contact 86 are uncoupled. Therefore, the RHCC controller and the DCC controller are generally not enabled at the same time, which can reduce power consumption relative to a scenario where multiple controllers are enabled.

Figure 13:
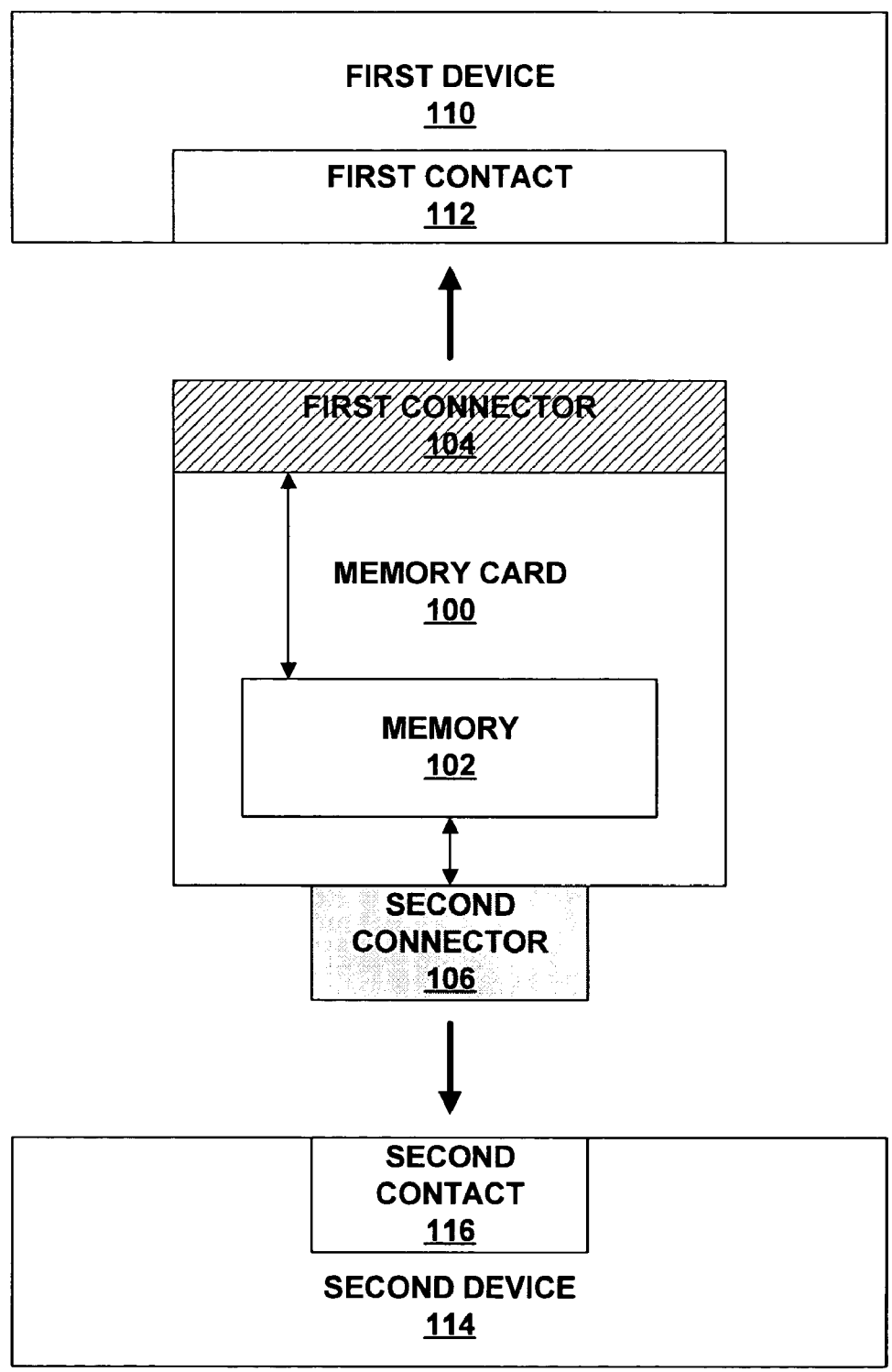
FIG. 13 is a block diagram illustrating a system according to an embodiment of the invention.

FIG. 13 is a block diagram illustrating a system according to an embodiment of the invention. The system includes a memory card 100, a first device 10, and a second device 114. Memory card 100 may correspond to any of the memory cards described herein. Memory card 100 includes a memory 102, a first connector 104, and a second connector 106. Connectors 104, 106 each conform to either a DCC standard or an HCC standard. First connector 104 and second connector 106 may be electrically coupled to memory 102 via a controller or a plurality of controllers (not shown).

First device 110 includes a first contact 112, and second device 114 includes a second contact 116. First contact 112 conforms to the DCC or HCC standard supported by first connector 104 on memory card 100. First connector 104 can couple to first contact 112 and allow communication between first device 110 and memory 102 on memory card 100. Second contact 116 conforms to the DCC or HCC standard supported by second connector 106 on memory card 100. Second connector 106 can couple to second contact 116 and allow communication between second device 114 and memory 102 on memory card 100.

Figure 14:
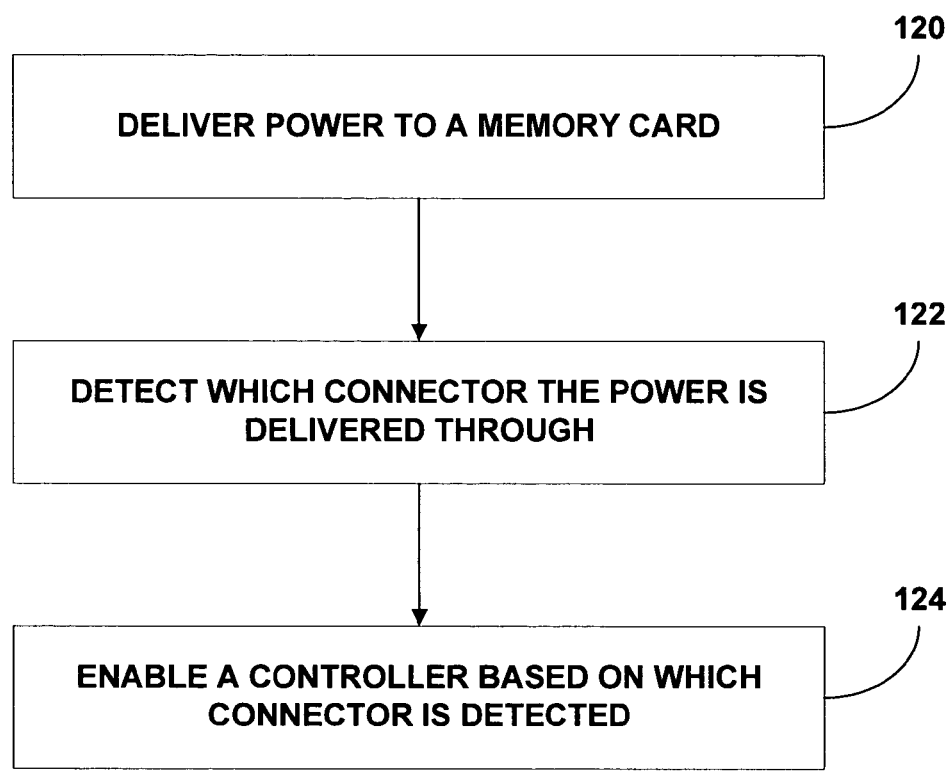
FIG. 14 is a flow diagram illustrating a method according to an embodiment of the invention.

FIG. 14 is a flow diagram illustrating a method for using a removable memory card 100, which may correspond to any of the memory cards described herein. Memory card 100 includes a memory 102, a first connector 104, and a second connector 106. Power is delivered to memory card 100 (120)

when it is coupled to a first device 110 or a second device 114. In particular, power can be delivered from the first device 110 or the second device 114 to memory card 100. The first device 110 or second device 114 may then detect which connector 104 or 106 is being used to deliver the power to memory card 100 (122) by determining which connector 104 or 106 has active electrical contact elements. A connector controller corresponding to the connector 104 or 106 with the active contact elements may then be enabled (124). When enabled, the enabled controller allows the first device 110 or the second device 114 access to memory 102 via a memory controller. The memory controller may allow the first device 110 or second device 114 to read the data that is stored in memory 102. The devices 110, 114 may also be able to write new data to memory 102. In some embodiments the memory controller may allow existing data stored in memory 102 to be modified or deleted.

Various embodiments of the invention have been described. For example, several memory card architectures have been described that use different sets of controllers to control the memory and output via the connectors. Several memory card layouts have also been described with regard to connector type and placement. One memory card has been described that includes a device communication connector such as a Compact Flash connector and a host communication connector such as a USB connector. The memory card of that embodiment can eliminate the need for a memory card adapter or reader to couple to a computing device. Another memory card has been described that includes multiple connectors conforming to multiple formats. The memory card of that embodiment may be used in place of several conventional, single connector memory cards and their corresponding adapters or readers. These and other embodiments are within the scope of the following claims.

The invention claimed is:

1. A memory card comprising:
   a memory;
   a first connector electrically coupled to the memory and conforming to a first connector standard;
   a second connector electrically coupled to the memory and conforming to a second connector standard, wherein the first connector standard comprises a host computer connector (HCC) standard and the second connector standard comprises a device communication connector (DCC) standard; and
   a controller that controls the memory and controls output via the first connector and the second connector, wherein the first and second connectors are electrically coupled to the memory through the controller and wherein the controller comprises a memory controller integrated with a first connector controller conforming to the first connector standard and integrated with a second connector controller conforming to the second connector standard, wherein at least one of the first connector and the second connector comprises a retractable connector that can be positioned in an extended position and a retracted position, wherein the retractable connector retracts linearly within a slot of memory card from the extended position to the retracted position along an axis parallel to an edge of the memory card.

2. The memory card of claim 1, wherein:
   the HCC comprises a standard selected from a group consisting of: a personal computer memory card international association (PCMCIA) standard, a PC Card standard, a CardBus standard, a Universal Serial Bus (USB) standard, a Universal Serial Bus 2 (USB2) standard, an IEEE 1394 FireWire standard, a Small Computer System Interface (SCSI) standard, an Advance Technology Attachment (ATA) standard, a serial ATA standard, a Peripheral Component Interconnect (PCI) standard, and a conventional serial or parallel standard; and
   the DCC comprises a standard selected from a group consisting of: a Compact Flash standard, a Smart Media standard, a MultiMedia Card standard, a Secure Digital standard, a Memory Stick standard, and an xD standard.

3. The memory card of claim 1, wherein the first connector is disposed on a different side of the memory card than the second connector.

4. The memory card of claim 3, wherein the first connector is disposed on an opposite side of the memory card relative to the second connector.

5. The memory card of claim 1, further comprising:
   a housing defining the slot for the retractable connector; and
   a first electrical contact on the retractable connector and a second electrical contact within the slot, wherein the first electrical contact couples to the second electrical contact when the retractable connector is extended from the slot.

6. The memory card of claim 1, wherein the first connector is disposed on the same side of the memory card as the second connector.

7. The memory card of claim 6, wherein a set of electrical contact elements of the first connector comprise a subset of a set of electrical contact elements of the second connector.

8. A memory card comprising:
   a memory;
   a first connector electrically coupled to the memory and conforming in a first connector standard;
   a second connector electrically coupled to the memory and conforming to a second connector standard, wherein the first connector standard comprises a host computer connector (HCC) standard and the second connector standard comprises a device communication connector (DCC) standard;
   a first controller electrically coupled to the memory and the first connector, the first controller controlling the memory and output via the first connector, wherein the first controller comprises a memory controller integrated with a first connector controller conforming to the first connector standard; and
   a second controller electrically coupled to the second connector and the first controller, the second controller controlling output via the second connector and conforming to the second connector standard, wherein the first connector is electrically coupled to the memory through the first controller, and the second connector is electrically coupled to the memory through the second controller and the first controller, wherein at least one of the first connector and the second connector comprises a retractable connector that can be positioned in an extended position and a retracted position, wherein the retractable connector retracts linearly within a slot of the memory card from the extended position to the retracted position along an axis parallel to an edge of the memory card.

9. The memory card of claim 1, further comprising a third connector electrically coupled to the memory and conforming to a third connector standard.

10. The memory card of claim 9, further comprising a fourth connector electrically coupled to the memory and conforming to a fourth connector standard.

11. A system comprising:
   a first device including a first electrical contact for receiving a connector that conforms to a first connector standard;

a second device including a second electrical contact for receiving a connector that conforms to a second connector standard; and a memory card including:

a memory, a first connector conforming to the first connector standard such that the first connector can be received by the first electrical contact of the first device, a second connector conforming to the second connector standard such that the second connector can be received byte second electrical contact of the second device, wherein die first connector standard comprises a host computer connector (HCC) standard and the second connector standard comprises a device communication connector (DCC) standard, and a controller that controls the memory and controls output via the first connector and the second connector, wherein the first and second connectors are electrically coupled to the memory through the controller and wherein the controller comprises a memory controller integrated with a first connector controller conforming to the first connector standard and integrated wit a second connector controller conforming to the second connector standard, wherein at least one of the first connector and the second connector comprises a retractable connector that can be positioned in an extended position and a retracted position, wherein the retractable connector retracts linearly within a slot of the memory card from the extended position to the retracted position along an axis parallel to an edge of the memory card.

12. The system of claim 11, wherein the first connector standard comprises a DCC standard selected from a group consisting of: a Compact Flash standard, a Smart Media standard, a MultiMedia Card standard, a Secure Digital standard, a Memory Stick standard, and an xD standard; and the second connector standard comprises an HCC standard selected from a group consisting of: a personal computer memory card international association (PCMCIA) standard, a PC Card standard, a CardBus standard, a Universal Serial Bus (USE) standard, a Universal Serial Bus 2 (USB2) standard, an IEEE 1394 FireWire standard, a Small Computer System Interface (SCSI) standard, an Advance Technology Attachment (ATA) standard, a serial ATA standard, a Peripheral Component Interconnect (PCI) standard, and a conventional serial or parallel standard.

13. A system comprising:

a first device including a first electrical contact for receiving a connector that conforms to a first connector standard;

a second device including a second electrical contact for receiving a connector that conforms to a second connector standard; and a memory card including:

a memory, a first connector conforming to the first connector standard such that the first connector can be received by the first electrical contact of the first device, a second connector conforming to the second connector standard such that the second connector can be received by the second electrical, contact of the second device, wherein the first connector standard comprises a host computer connector (HCC) standard and the second connector standard comprises a device communication connector (DCC) standard, a first controller electrically coupled to the memory and the first connector, the first controller controlling the memory and output via the first connector, wherein the first controller comprises a memory controller integrated wit a first connector controller conforming to the first connector standard, and a second controller electrically coupled to the second connector and die first controller, the second controller controlling output via the second connector and conforming to the second connector standard, wherein the first connector is electrically coupled to the memory through the first controller, and the second connector is electrically coupled to the memory through the second controller and the first controller, wherein at least one of the first connector and the second connector comprises a retractable connector that can be positioned in an extended position and a retracted position, wherein the retractable connector retracts linearly within a slot of the memory card from the extended position to the retracted position along an axis parallel to an edge of the memory card.

14. A memory card comprising:

a memory;

a first connector electrically coupled to the memory and conforming to a first connector standard;

a second connector electrically coupled to the memory and conforming to a second connector standard, wherein the first connector standard comprises a host computer connector (HCC) standard and the second connector standard comprises a device communication connector (DCC) standard; and one or more controllers that control the memory and control output via die first connector and the second connector, wherein the first and second connectors are formed along a common side of the memory card and wherein electrical contacts of the second connector comprise a subset of electrical contacts of the first connector, wherein the second connector comprises a retractable connector that can be positioned in an extended position and a retracted position and wherein the retractable connector retracts linearly within a slot of the memory card from the extended position to the retracted position along an axis parallel to an edge of the memory card.

15. The memory card of claim 14, wherein the electrical contacts of the second connector comprise movable contacts that form the second connector when the second connector is in the extended position, and wherein the electrical contacts of the second connector comprise a subset of the electrical contacts of the first connector when the second connector is in the retracted position.

* * * * *

UNITED STATES PATENT AND TRADEMARK OFFICE
CERTIFICATE OF CORRECTION

| | |
|---|---|
| PATENT NO. | : 7,535,718 B2 |
| APPLICATION NO. | : 10/644484 |
| DATED | : May 19, 2009 |
| INVENTOR(S) | : Trung V. Le |

It is certified that error appears in the above-identified patent and that said Letters Patent is hereby corrected as shown below:

Column 12
    Line 31, "in" should read --to--.

Column 13
    Line 11, "byte" should read --by the--.
    Line 12, "die" should read --the--.
    Line 23, "wit" should read --with--.

Column 14
    Line 3, "electrical, contact" should read --electrical contact--.
    Line 12, "wit" should read --with--.
    Line 15, "die" should read --the--.
    Line 40, "die" should read --the--.

Signed and Sealed this

Sixth Day of October, 2009

David J. Kappos
*Director of the United States Patent and Trademark Office*